Jan. 9, 1923. 1,441,406
W. R. DALES.
INFANT'S NURSING DEVICE.
FILED JAN. 18, 1921.
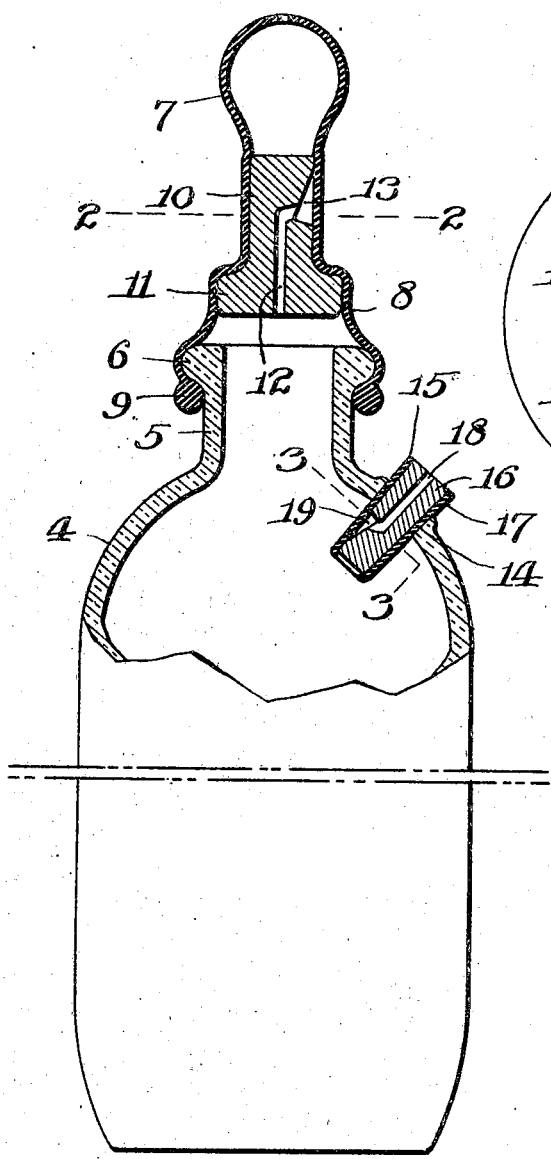
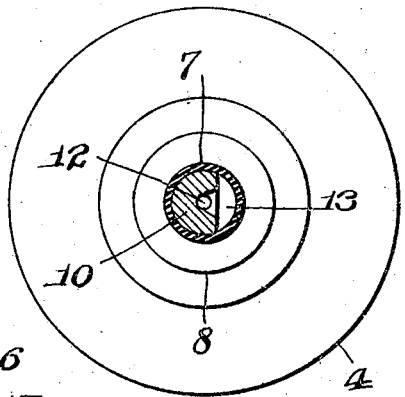
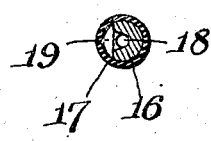
INVENTOR.
William R. Dales
BY
ATTORNEY.

Patented Jan. 9, 1923.

1,441,406

UNITED STATES PATENT OFFICE.

WILLIAM R. DALES, OF PHILADELPHIA, PENNSYLVANIA.

INFANT'S NURSING DEVICE.

Application filed January 18, 1921. Serial No. 438,079.

*To all whom it may concern:*

Be it known that I, WILLIAM R. DALES, a citizen of the United States, residing at Philadelphia, in the county of Philadelphia, and State of Pennsylvania, have invented certain new and useful Improvements in Infants' Nursing Devices, of which the following is a specification.

This invention relates to improvements in infants' nursing devices.

Devices of this character in general use comprise a bottle and a rubber nipple applied to the neck thereof, and they have been objectionable: first, because the creation of a partial vacuum within the bottle by an infant drawing milk therefrom through the nipple has prevented the proper and uniform flow of milk from the bottle and has caused milk and saliva to return to the bottle from the infant's mouth carrying bacteria and germs which rapidly multiply in the milk within the bottle to the detriment of the health of the infant; second, because the creation of the partial vacuum within the bottle and the consequent prevention of the free flow of milk therefrom has caused the infant to suck air into the stomach through openings between the nipple and the infant's mouth; and, third, because milk is frequently spilled from the bottle through the nipple when the infant removes the nipple from its mouth occasionally during feeding and when the bottle containing milk is on its side or tilted from an upright position sufficiently to permit the milk to flow to and through the opening in the nipple.

The object of my invention is to overcome the aforesaid objectionable characteristics; and with this and related objects in view, the invention consists in the novel construction, combination and arrangement of parts hereinafter described and claimed.

In the accompanying drawings illustrating my invention,

Figure 1 is an enlarged vertical section through a nursing device embodying my invention, certain parts being broken away.

Figure 2 is a horizontal section thereof, on line 2—2 of Fig. 1.

Figure 3 is a sectional detail of one of the valves, on line 3—3 of Fig. 1.

Referring to the drawings, 4 designates a glass bottle of the type commonly known as a nursing bottle used for nursing purposes, the same being provided with the usual neck 5 having the flange or bead 6 around the open end thereof.

Mounted on the neck 5 is a nipple 7 which is formed of rubber and provided with an expanded or enlarged lower portion 8 having a ring 9 formed on the bottom thereof, the bottom of the enlarged portion 8 and the ring 9 being stretched around the bead 6 and neck 5 in a manner to hold the nipple in place and prevent its accidental withdrawal from the bottle. The upper or free end of the nipple has a discharge opening therein.

Fitted tightly within the nipple 7 is a plug or member 10 having a flange or head 11 formed on the lower end thereof which is seated within the enlarged lower portion 8 of the nipple and which engages the shoulder formed between the upper portion of the nipple and the enlarged lower portion 8 thereof to prevent accidental upward displacement of the member within the nipple.

The member 10 is provided with a passage 12 extending vertically through the lower, central portion of the member 10 and having its lower end in communication with the interior of the bottle 4. The upper end of the passage 12 opens laterally into a larger cavity or depression 13 in one side of the member 10. The rubber nipple 7 engages the member 10 entirely around the same and engages the cylindrical surface thereof entirely around the depression 13 and normally prevents the flow of milk or other liquid from the bottle 4 to the free or discharge end of the nipple when the bottle is laid on its side or tilted so that the contents thereof flows to the member 10. When the device is in nursing service, the infant may readily draw milk or other liquid from the bottle 4, the suction created by the infant expanding that part of the rubber nipple which surrounds the depression 13 in the member 10 and thereby permitting the liquid to flow from the bottle 4 to and through the discharge end of the nipple 7. The body of the nipple thus acts as a valve to govern the flow of liquid through the passage 12.

The body of the bottle 4 has an air inlet opening 14 which is normally closed by a tapered plug 15 seated therein and comprising a core member 16 and a surrounding tube 17 of rubber. The core member has an air passage 18 extending centrally through the outer portion thereof and having its inner end opening laterally into a cavity or depression 19 in one side of the core member 16. The outer end of the passage 18 is open exteriorly of the bottle, and the portion of the plug 15 containing the cavity 19 is located within the bottle 4. The rubber tube 17 normally closes the cavity 19 and acts as a valve to prevent liquid from flowing from the bottle 4 through the passage 18 and to permit air to be drawn into the bottle through the passage 18 by the effort to create a partial vacuum therein drawing the rubber tube 17 away from the cavity. It will thus be understood that air may enter the bottle through the passage 18 as rapidly as the liquid is drawn from the bottle through the passage 12 and nipple 7.

The exterior diameters of the parts 10 and 16 are slightly greater than the interior diameters of the rubber parts surrounding them, so that they will be held in place within their rubber coverings by the tendency of the rubber stretched around them to resume its normal condition.

The nipple 7 may be readily removed from the bottle 4 and replaced, the part 10 may be readily removed from and replaced within the nipple 7, and the core member 16 may be readily removed from and replaced within the rubber tube 17 for washing and sterilization.

The inner end of the rubber tube 17 is contracted slightly beyond the inner end of the core member 16 to prevent the core member from being accidentally pushed through the tube when the plug 15 is inserted into the opening 14.

I claim as my invention:

1. The combination of a receptacle provided with a part extending therefrom, said part having a fluid passage therein, the inner end of which opens into the receptacle and the outer end of which opens laterally of said part, and an elastic band surrounding said part and normally closing the outer end of said passage.

2. The combination of a receptacle having a nursing nipple connected thereto and communicating therewith, said receptacle having a part extending into the interior thereof and provided with a fluid passage the outer end of which opens exteriorly of the receptacle and the inner end of which opens laterally of said part within the receptacle, and an elastic band surrounding said part and normally closing the inner end of said passage.

In testimony whereof I affix my signature hereto.

WILLIAM R. DALES.